Nov. 8, 1966   P. THOME   3,284,315
NUCLEAR REACTOR FUEL ELEMENT ASSEMBLY
Filed Dec. 4, 1964   3 Sheets-Sheet 2

INVENTOR
PAUL THOME
BY
Bacon & Thomas
ATTORNEYS

INVENTOR
PAUL THOME
BY
ATTORNEYS

United States Patent Office 3,284,315
Patented Nov. 8, 1966

3,284,315
NUCLEAR REACTOR FUEL ELEMENT ASSEMBLY
Paul Thome, Saint-Cloud, France, assignor to Commissariat à l'Energie Atomique, Paris, France
Filed Dec. 4, 1964, Ser. No. 415,928
Claims priority, application France, Dec. 18, 1963, 957,629
6 Claims. (Cl. 176—76)

The present invention relates to a fuel element assembly for gas-cooled nuclear reactors.

The invention is more especially concerned among fuel element assemblies of this type with those which are commonly referred to as "fuel element clusters" in which the clad fuel rods known as "fuel pencils" are assembled parallel to each other in a cluster or bundle and maintained in this geometry as defined by structural elements which are also intended to endow said fuel element assemblies with resistance to a certain number of mechanical and thermal stresses and to permit the movement of said fuel element assemblies within the reactor fuel channels by means of supporting and coupling devices for loading and unloading operations.

The invention is even more especially concerned with fuel element assemblies in which, in order to limit the stresses to which they are subjected, the fuel pencils are only held at one end in a support grid whilst the other end is allowed freedom of sliding movement, the cans being as thin as possible for reasons of neutron economy and mechanical stresses being accordingly transmitted to rigid structural members.

The need to extract a greater amount of heat from a fuel element in order to increase energy yield entails as a natural consequence the need to increase to a maximum extent the surface area which is exposed to the cooling action of the heat-transporting fluid. Fuel element clusters, each formed of an assembly of juxtaposed fuel elements or "fuel pencils," are an example of the manner in which this requirement is carried into practice. If consideration is given to identical fuel pencils, the most closely grouped clusters which are composed of successive rings will consist of 7, 19, etc., fuel pencils.

However, when it is found necessary to come as closely as possible to the achievement of satisfactory characteristics, every effort must accordingly be made to comply with a certain number of conditions, the importance of which can also vary according to the nature of the coolants employed such as pressurized water, boiling water or gas under pressure. A fuel element clutser is formed of an assembly of unitary fuel pencils and this assembly is subjected to a certain number of mechanical stresses which are produced as a result of handling of the fuel within the reactor channel, stresses arising from pressure drops, stresses induced by friction of the fluid, vibrations, stresses of thermal origin, and the radiation effects of fission products.

It is obviously required that the fuel element should withstand these various stresses throughout the design period of irradiation while at the same time retaining as low a neutron-absorption capacity as possible. From the point of view of neutron economy, it is preferable on the one hand to employ unitary fuel pencils which are as long as possible in order to reduce within each channel the mass of structural material employed in the construction of the ends of fuel elements and clusters (end-plugs, support grids) and, on the other hand, all other things being equal, to make provision for the maximum quantity of fissionable material.

However, in order to have advantageous characteristics, the maximum quantity of heat must be delivered per unit volume of fuel, which presupposes very high thermal gradients within the fuel and good efficiency of the coolant. This results in thermal instability of the fuel pencil. If the fuel pencil becomes bowed to a slight extent, the passageway which is provided for the coolant is reduced, the longest outer jacket is the least efficiently cooled and the process accelerates both in temperature rise and deformations with attendant local melting of the can.

As a further requirement which mainly applies to the utilization of fuel element clusters in reactors of the pressure tube type, it is essential to make provision for heat insulating means, the function of which is to permit of operation of structural materials at low temperature and to obtain advantageous thermal and electrical performances. The heat insulating means referred to serve to protect the pressure tubes. A very great number of difficulties have been encountered in the design of such heat insulating means, the service life of which must be close to that of the pressure tube.

The primary aim of the invention is to make the fuel element assemblies described above such that they meet the various practical requirements more effectively than has been possible heretofore, especially insofar as they serve to reduce to a minimum both the overall size, neutron absorption capacity and integrated neutron flux in the case of the heat insulating material.

The invention mainly consists of a fuel element assembly for gas-cooled nuclear reactors, wherein canned fuel rods are assembled in parallel relation so as to form a fuel cluster and are maintained in this geometry by means of structural members, said structural members comprising at least one support grid and an outer sleeve, characterized in that said outer sleeve is fitted with a heat insulating packing which can be keyed in position by means of vibration-absorbing material.

Apart from this main arrangement, the invention also consists of a certain number of other arrangements which are preferably employed at the same time, namely: the heat insulating material is silica; the heat insulating material is expanded alumina; the heat insulating material is silicon carbide foam; the heat insulating material is silca fiber which can be clad with thin metallic sheet; the vibration-absorbing material is graphite felt.

A clearer understanding of the invention will in any case be gained from the complementary description which follows below and from the accompanying drawings, it being understood that said complementary description and drawings are given solely by way of indication and not in any sense by way of limitation.

Figure 1:
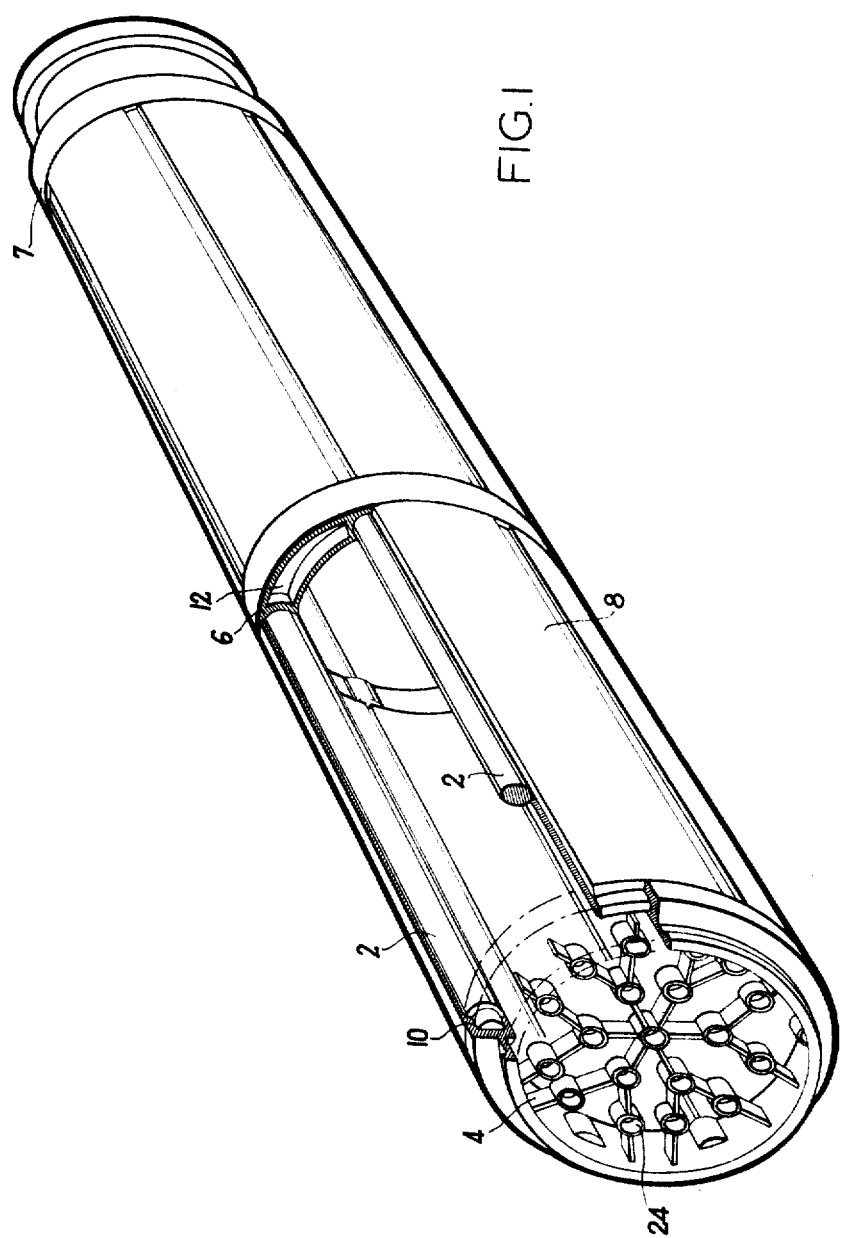
FIG. 1 is a view in isometric perspective and partially cut away, showing a fuel element assembly in accordance with the invention.

As can be seen from FIG. 1, the fuel element cluster according to the invention is surrounded by an assembly of structural materials forming a "squirrel cage" and comprising an assembly of strengthening rods such as the rod 2, a support grid 4 in which the fuel pencils are intended to be fitted, rings such as the ring 6 which are placed at different levels in order to prevent buckling of the fuel pencils while permitting of their free expansion, a last ring such as 7 being also provided at the other end of the fuel element assembly for the purpose of replacing the second support grid, and finally a packing material 8 which is transparent to neutrons and which is held in place in the cage assembly by means of grooves such as 10 and 12 which are provided around the periphery of the support grid 4 and the rings such as 6.

Figure 2:
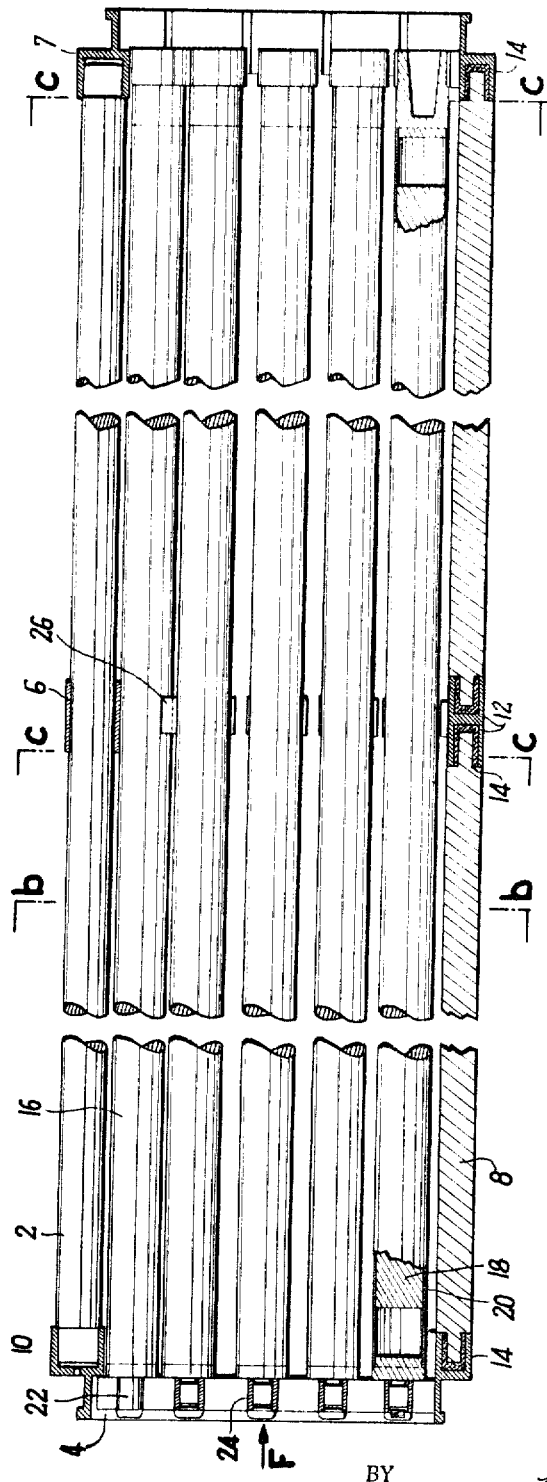
FIG. 2 is a view in longitudinal cross-section taken along the line a—a of FIG. 3 and showing a fuel element assembly in accordance with the invention.

There is also shown in FIG. 2 a strengthening rod such as 2, the end support grid 4 which is provided with its groove 10, an intermediate ring 6 in which are formed grooves such as 12, the end ring 7 and the heat insulating packing material 8 which is held in place within the grooves such as those designated by the references 10 and 12. Provision can be made between said grooves and the material 8 for members such as the member 14 which are formed, for example, of graphite felt and which are intended to eliminate all possible vibrations. The fuel pencils such as 16 which consist of fuel material 18 surrounded by a can 20 are provided with end nipples such as the nipple 22 which are designed to fit into recesses such as 24 of the end support grid 4. The fuel pencils 16 are held within the recesses of the braces 6 and 7 and are allowed freedom of sliding movement within these latter.

It will thus be apparent that the fuel pencils 16 are only secured by spot welds between their nipples and the support grid 4.

Figure 3:
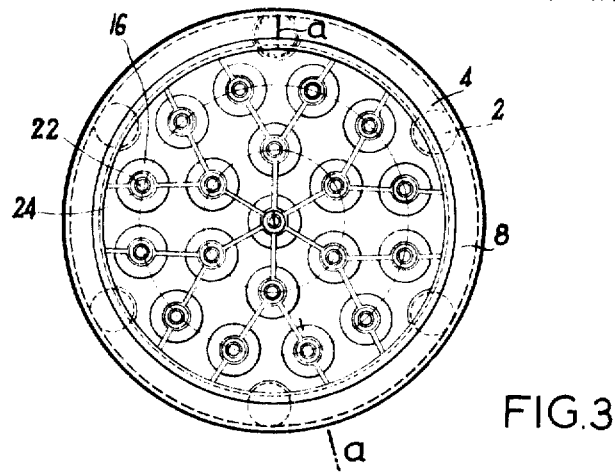
FIG. 3 is a view looking in the direction of the arrow F of FIG. 2 and showing a fuel element assembly in accordance with the invention.

FIG. 3 also clearly shows the arrangement of said support grid 4 with its recesses such as the recess 24 in which are fitted the nipples such as 22 of the fuel pencils such as 16. There have also been shown in broken lines in this figure the strengthening rods such as the rod 2 and the insulating material 8.

Figure 4:
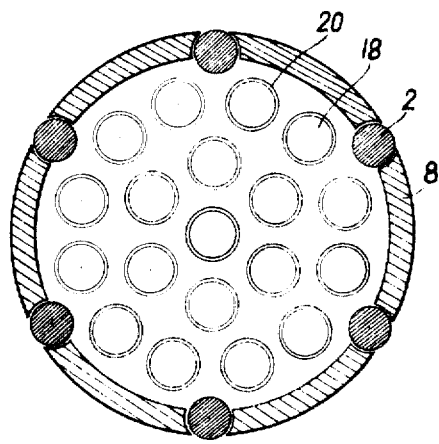
FIG. 4 is a view in transverse cross-section taken along the line b—b of FIG. 2 and showing a fuel element assembly in accordance with the invention.

In FIG. 4, which is a transverse cross-section taken at a level in which there is neither support grid nor brace, there is only shown the fuel material 18, the fuel cladding tube 20, the strengthening rods such as the rod 2 and the insulating material 8.

Figure 5:
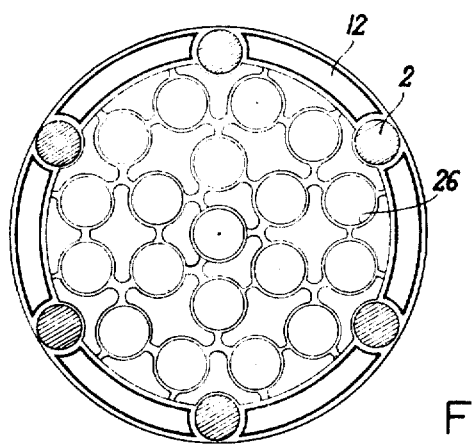
FIG. 5 is a view in transverse cross-section taken along the line c—c of FIG. 2 and showing a fuel element assembly in accordance with the invention.

Finally, in FIG. 5, which is a cross-section taken at the level of a brace 6, there can be seen the configuration of said brace, the shape of the grooves 12 which are formed in the outer ring of said brace as well as the strengthening rods such as the rod 2.

In a particular example of construction of a fuel element assembly according to the invention which will be described in reference to all of the figures, the packing elements such as the element 8 of heat insulating material can be formed of silica, expanded alumina, silicon carbide foam having a thermal conductivity of $23.10^4$ cal./sec. cm. °C., or alternatively silica fiber which can be clad with thin metallic sheet. Always in this example, the strengthening rods such as the rod 2 can be formed of beryllium, whereas the support grid 4 and rings such as 6 and the ring 7 can be made of stainless steel which is brazed onto the beryllium in a known manner. The keying members such as the member 14 can be formed of graphite felt. The insulating members 8 are held within the grooves such as 10 and 12 of the support grid 4 and of the rings 6 and 7 and can be placed in position prior to welding of the beryllium members. There are applied against the rings 6 and 7 the spacer members such as the member 26 which support the outer fuel pencils.

The construction of a fuel element assembly in accordance with the example described is carried out as follows:

There is first constructed a "squirrel cage" by fitting onto the rods such as 2 first a ring such as the ring 7 followed by packing with insulating members such as the member 8, then a ring such as the ring 6 followed a further packing with insulating members such as the member 8 and so on in sequence and finally the top support grid 4, whereupon the assembly is completed by brazing in vacuo of the support grid 4 and the rings 6 and 7 onto the rods 2.

The "squirrel cage" as thus constructed is fitted over a cluster which has previously been set in position and which is formed of of fuel pencils such as the fuel pencil 16, the nipples such as 22 of said fuel pencils being positioned within the recesses such as 24 of the end support grid 4.

Finally, the nipples 22 are fixed within the recesses 24 by means of spot welds.

As will be understood, and as has in any case been brought out by the foregoing description, the present invention is not limited in any sense to the example of construction which has been described and illustrated but is intended on the contrary to include within its scope all alternative forms and especially those in which provision is made for any number of rods such as the rod 2, of insulating members such as 8, of fuel pencils such as 16 and intermediate rings such as 6.

What I claim is:

1. An improvement in a fuel element assembly for gas-cooled nuclear reactors, wherein canned fuel rods are assembled in parallel relation so as to form a fuel cluster and are maintained in this geometry by means of at least one support grid having an outer sleeve, said improvement comprising fitting said outer sleeve with a heat insulating packing keyed in position to said outer sleeve by means of vibration-absorbing material.

2. An improvement in a fuel element assembly in accordance with claim 1, in which the heat insulating packing material is silica.

3. An improvement in a fuel element assembly in accordance with claim 1, in which the heat insulating material is expanded alumina.

4. An improvement in a fuel element assembly in accordance with claim 1, in which the heat insulating material is silicon carbide foam.

5. An improvement in a fuel element assembly in accordance with claim 1, in which the heat insulating material is silica fiber clad with a thin metallic sheet.

6. An improvement in a fuel element assembly in accordance with claim 1, in which the vibration-absorbing material is graphite felt.

No references cited.

References Cited by the Applicant

FOREIGN PATENTS

| | | |
|---|---|---|
| 1,233,087 | 4/1959 | France. |
| 1,339,615 | 8/1962 | France. |
| 861,329 | 7/1958 | Great Britain. |
| 933,455 | 3/1961 | Great Britain. |

BENJAMIN R. PADGETT, *Primary Examiner.*

M. J. SCOLNICK, *Assistant Examiner.*